United States Patent
Kim et al.

(10) Patent No.: US 10,877,576 B2
(45) Date of Patent: Dec. 29, 2020

(54) STYLUS PEN

(71) Applicant: HiDeep Inc., Seongnam-si (KR)

(72) Inventors: Seyeob Kim, Seongnam-si (KR);
Hyoungwook Woo, Seongnam-si (KR);
Joohyun Go, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 0 days.

(21) Appl. No.: 15/984,504

(22) Filed: May 21, 2018

(65) Prior Publication Data

US 2018/0356911 A1   Dec. 13, 2018

(30) Foreign Application Priority Data

Jun. 9, 2017 (KR) .................. 10-2017-0072415
Jun. 27, 2017 (KR) .................. 10-2017-0081225

(51) Int. Cl.
*G06F 3/0354* (2013.01)

(52) U.S. Cl.
CPC ................ *G06F 3/03545* (2013.01)

(58) Field of Classification Search
CPC .................................................. G06F 3/03545
See application file for complete search history.

(56) References Cited

U.S. PATENT DOCUMENTS

| | | | | |
|---|---|---|---|---|
| 8,648,837 B1 * | 2/2014 | Tran | ..................... | G06F 3/03545 345/179 |
| 9,158,394 B2 | 10/2015 | Mao et al. | | |
| 9,195,351 B1 * | 11/2015 | Rosenberg | ............ | G06F 1/3215 |
| 9,298,285 B2 | 3/2016 | Mohindra et al. | | |
| 2014/0267192 A1 * | 9/2014 | Matsuura | ............ | G06F 3/03545 345/179 |
| 2015/0109239 A1 * | 4/2015 | Mao | ..................... | G06F 3/03545 345/174 |
| 2015/0160744 A1 * | 6/2015 | Mohindra | ........... | G06F 3/03545 345/179 |
| 2017/0249028 A1 * | 8/2017 | Marshall | .............. | G06F 3/03545 |
| 2018/0052535 A1 * | 2/2018 | Sakuishi | .............. | G06F 3/03545 |
| 2018/0267636 A1 * | 9/2018 | Chiu | ..................... | G06F 1/1643 |
| 2019/0129524 A1 * | 5/2019 | Kim | ...................... | G06F 3/0383 |
| 2019/0179433 A1 * | 6/2019 | Kim | ..................... | G06F 3/03545 |

FOREIGN PATENT DOCUMENTS

| | | |
|---|---|---|
| KR | 10-1328042 | 11/2013 |
| KR | 10-1680253 | 11/2016 |

* cited by examiner

*Primary Examiner* — Amare Mengistu
*Assistant Examiner* — Jennifer L Zubajlo
(74) *Attorney, Agent, or Firm* — Lex IP Meister, PLLC

(57) ABSTRACT

A stylus pen according to an exemplary embodiment includes: a main body; a holder that is connected to the main body and of which an opening is formed at an end thereof; a stylus tip that is formed by being partially or wholly derived in the opening of the holder, and of which at least a part has a shape of a sphere or a shape of which some area contacting a sense surface has a constant curvature; and a conductive member that is electrically connected to the stylus tip and extends to the holder and the interior of the main body. According to the exemplary embodiments of the present invention, a program caused due to tilting of the stylus pen can be solved and touch sensitivity of the stylus tip can be enhanced.

13 Claims, 16 Drawing Sheets

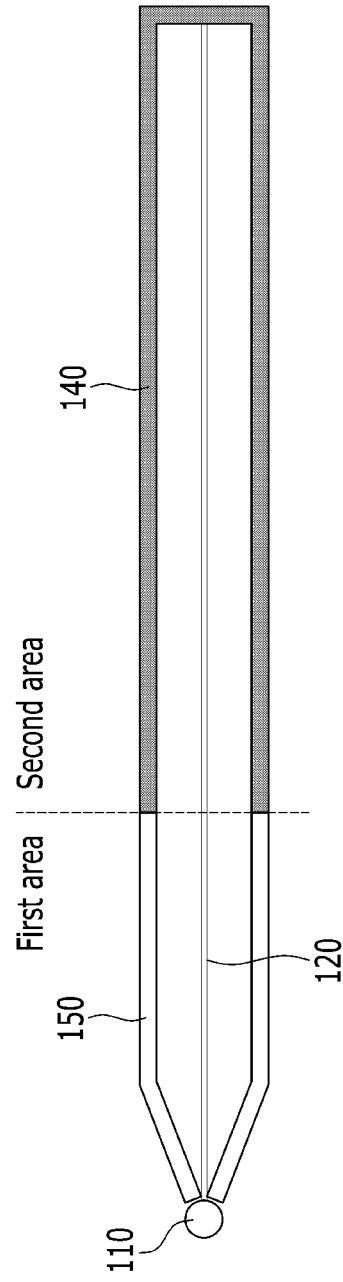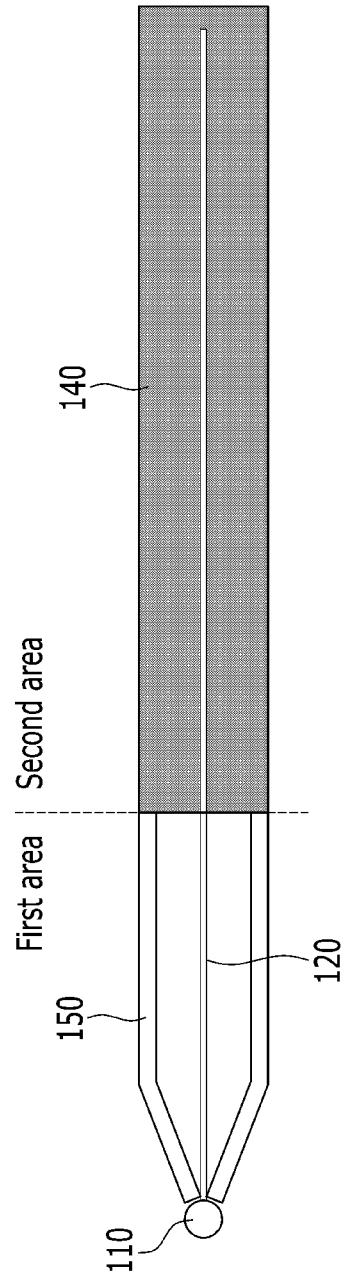

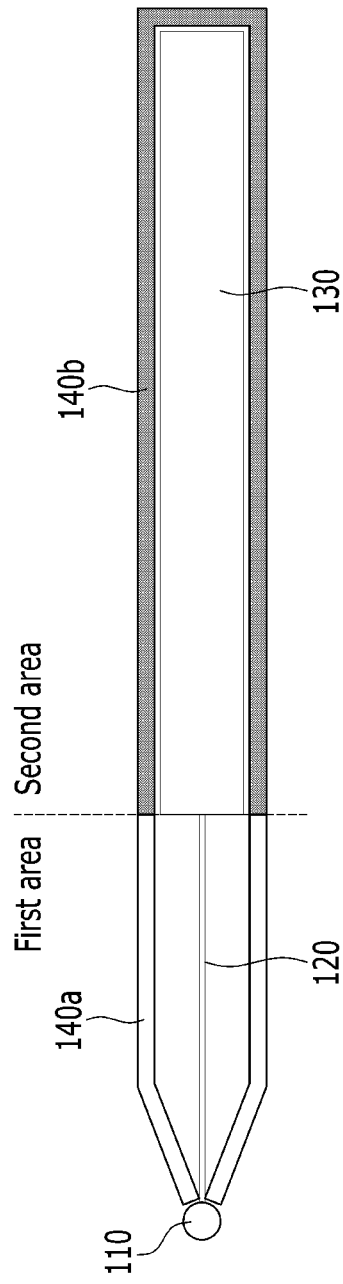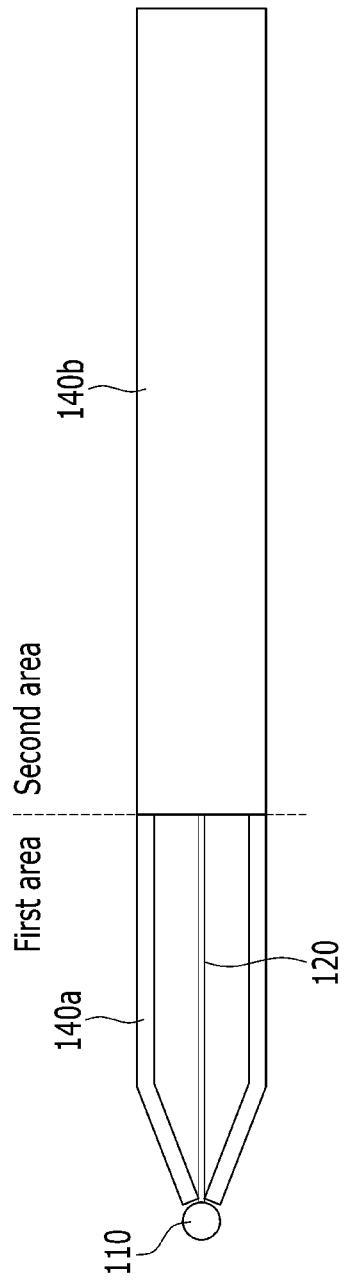

STYLUS PEN

CROSS-REFERENCE TO RELATED APPLICATION

This application claims priority to and the benefit of Korean Patent Application No. 10-2017-0072415 and 10-2017-0081 225 filed in the Korean Intellectual Property Office on Jun. 9, 2017 and Jun. 27, 2017, the entire contents of which are incorporated herein by reference.

BACKGROUND OF THE INVENTION

(a) Field of the Invention

The present disclosure relates to a stylus pen. More particularly, the present invention relates to a stylus pen for a capacitive touch screen.

(b) Description of the Related Art

In general, a touch panel (also called a touch panel) is provided in a portable terminal such as a smart phone, a navigation device, a PDA terminal, an MP3 player, a portable multimedia player (PMP), an electronic book, a tablet PC, and the like, and an input is carried out by contacting a keyboard or an icon displayed on the touch screen.

Input to the touch screen of each a terminal is usually carried by a user's hand. Recently, since the size of the smart phone has been increased by 5 to 6 inches compared to the past, there is a growing need for a sophisticated touch input such as for writing letters or directly drawing pictures in addition to carrying out a simple touch input on the touch screen of a smart phone or a tablet PC.

For such a sophisticated touch input, a stylus pen is used. The stylus pen may be classified into a constant pressure type of stylus pen that operates a keyboard and the like by applying a constant pressure on a touch screen, and a capacitive type of stylus pen that invokes a change in capacitance by contacting a desired location on the touch screen and measures the capacitance change. In case of the constant pressure type of stylus pen, a constant pressure is continuously applied whenever a touch is made on the touch screen, and thus the touch screen may be damaged, thereby causing a problem that touch recognition is not sufficiently performed, or an error. Due to such a reason, use of the more stable capacitive type of stylus pen has been increased.

Meanwhile, the stylus pen can be classified into an active stylus pen and a passive stylus pen depending on whether electronic parts are provided therein.

The active stylus pen has a merit of more sophisticated touch input than the passive stylus pen, but the cost and weight may be increased because a battery and electronic parts need to be included in the active stylus pen. The passive stylus pen may be inexpensive and light-weighted compared to the active stylus pen, but has drawbacks of low sensitivity and difficulty in sophisticated input.

FIG. 1 shows a passive stylus pen according to a conventional art. Referring to FIG. 1, a stylus pen 10 includes a bullet-shaped stylus tip 11 and a stylus main body 12. The stylus tip 11 is wholly or partially formed of a conductive material.

When an actual user uses the stylus pen 10, the stylus pen 10 is tilted at an angle of between 10 degrees and 45 degrees on a sense surface 20 rather than being used while perpendicular to the sense surface 20. When the stylus pen 10 is tilted, a capacitance variation amount becomes the greatest not at a contact location 21 between the stylus tip 11 and the sense surface 20 but at a location 22 toward a direction about which the stylus pen 10 is tilted at the contact location of the stylus pen 10. Accordingly, the contact location 21 at which the stylus tip 11 is actually contacted on the sense surface 20 is not displayed, but another location 22 that is close to the contact location 21 is recognized as a contact location. In this case, an offset 23 between the contact location 21 and the actually recognized location 22 may be over hundreds of micrometers.

As described, when the passive stylus pen according to the conventional art is used in a tilted manner, a linearity error is generated due to tilting of the stylus pen so that sophisticated touch input cannot be carried out.

U.S. Pat. No. 9,298,285 discloses a stylus pen for solving a problem that occurs when the passive stylus pen 10 is used in a tilted manner.

FIG. 2 and FIG. 3 show a structure of a stylus pen disclosed in U.S. Pat. No. 9,298,285.

In FIG. 2, a stylus pen 30 includes a sphere-shaped stylus tip 31 and a conductive member 32 connected to the stylus tip 31. Some area of the stylus tip 31 and the conductive member 32 are fixed by being surrounded by a holder 33 that is made of a non-conductive material. The holder 33 is connected to a stylus main body 34. In the structure of the stylus pen 20 shown in FIG. 2, the sphere-shaped stylus tip 31 is used, and thus the amount of capacitance variation becomes a maximum at a contact location without regard to a tilted degree, and a thin conductive member 32 is provided so that a capacitance variation amount due to the conductive member 32 can be minimized, thereby minimizing an offset due to the tilting of the stylus pen 20.

However, in the structure of the stylus pen shown in FIG. 2 and FIG. 3, the conductive member is in a floated stated and a distance between a portion gripped by a user and the conductive member 32 is large so that capacitance C1 between the user's hand the conductive member 32 is low, thereby causing a problem of low touch sensitivity of the stylus tip 31.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a stylus pen for enhancing a tilt offset and increasing touch sensitivity.

In addition, exemplary embodiment of the present inventions provide a stylus pen that can prevent cover glass of a touch screen from being damaged due to impact caused by the stylus tip or prevent generation of noise between the stylus tip and a sense surface.

A stylus pen according to an exemplary embodiment includes: a main body; a holder that is connected to the main body and of which an opening is formed at an end thereof; a stylus tip that is formed by being partially or wholly derived in the opening of the holder, and of which at least a part has a shape of a sphere or a shape of which some area contacting a sense surface has a constant curvature; and a conductive member that is electrically connected to the stylus tip and extends to the holder and the interior of the main body.

The main body and the holder may have different dielectric constants.

The dielectric constant of the main body may be higher than that of the holder.

The main body may be partially open and thus the conductive member may be exposed to the outside.

The stylus tip may include: a center body that is made of a plastic material; and a conductive layer that is provided at an outer side of the center body.

An insertion hole to which the conductive member is inserted may be formed in some area of the center body.

A stylus pen according to another exemplary embodiment includes: a first main body of which an opening is formed at an end thereof; a second main body connected to the first main body; a stylus tip that is formed by being partially or wholly derived in the opening of the first main body, and of which at least a part has a shape of a sphere or a shape of which some area contacting a sense surface has a constant curvature; a conductive member that is electrically connected to the stylus tip and extends to the interior of the first main body; and a conductive mass that is electrically connected to the conductive member and extends to the interior of the second main body.

The first main body and the second main body may have different dielectric constants.

The dielectric constant of the second main body may be higher than that of the first main body.

The conductive mass may have a larger surface area than the conductive member.

A fixing portion that fixes the stylus tip may be provided in the interior of the first main body.

One or more contact holes may be formed in an area of the second main body, contacting a user's fingers.

The contact hole may be filled with a conductive material and thus is electrically connected to the conductive mass.

The stylus tip may include: a center body that is made of a plastic material; and a conductive layer that is formed at an outer side of the center body.

An insertion hole to which the conductive member may be inserted in formed in some area of the center body.

A stylus pen according to another exemplary embodiment includes: a stylus tip of which at least a part has a shape of a sphere or a shape of which some area contacting a sense surface has a constant curvature; and a conductive member that is electrically connected to the stylus tip, wherein the stylus tip includes: a center body that is made of a nonconductive material; and a conductive layer that is formed at an outer side of the center body.

A first insertion hole and a second insertion hole may be respectively formed in a first area and a second area of the center body, and a bent portion of the conductive member is located in a space where the first insertion hole and the second insertion hole may cross each other.

The conductive member may be inserted into the first insertion hole and an end of the conductive member may be inserted into the second insertion hole.

A through-hole through which the conductive member is penetrated by being inserted therein may be formed in some area of the center body, and a conductive member unfastening prevention portion may be formed at an end of the conductive member that has penetrated the through-hole.

The stylus pen may further include an unfastening prevention cover that surrounds the conductive member unfastening prevention portion in a closely attached manner.

According to the exemplary embodiments of the present invention, a tilt offset of the stylus pen can be reduced and touch sensitivity of the stylus tip can be enhanced.

According to the exemplary embodiments of the present invention, a stylus pen that can prevent cover glass of a touch screen from being damaged due to impact caused by the stylus tip or prevent generation of noise between the stylus tip and a sense surface can be provided.

BRIEF DESCRIPTION OF THE DRAWINGS

FIG. 5A and FIG. 5B show a structure of a main body and a holder of the stylus pen according to the first exemplary embodiment of the present invention.

FIG. 8A and FIG. 8B show a structure of a main body of the stylus pen according to the second exemplary embodiment of the present invention.

DETAILED DESCRIPTION OF THE EMBODIMENTS

Figure 1:
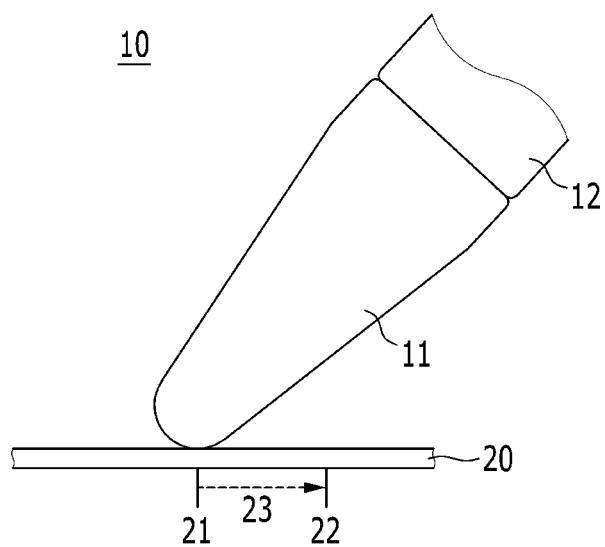
FIG. 1 to FIG. 3 show a stylus pen according to a conventional art.
Figure 2:
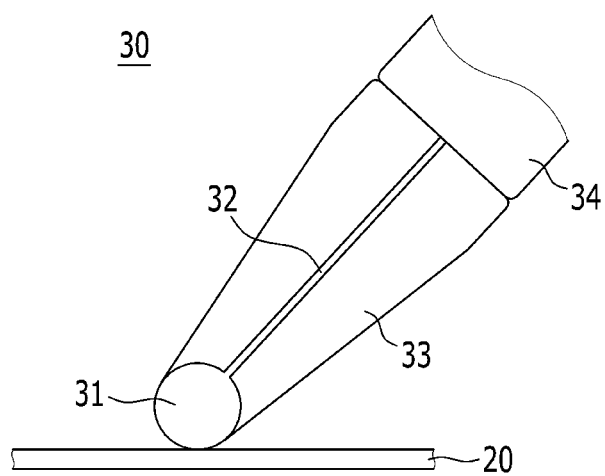

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification In addition, in the case of publicly known technologies, a detailed description thereof will be omitted.

In the present specification, unless explicitly described to the contrary, the word "comprise" and variations such as "comprises" or "comprising" will be understood to imply the inclusion of stated elements but not the exclusion of any other elements. It will be understood that when a part is referred to as being "on" another part, it can be directly on the other part or an intervening part may also be present. In contrast, when a part is referred to as being "directly on" another part, there are no intervening parts present.

Figure 4:
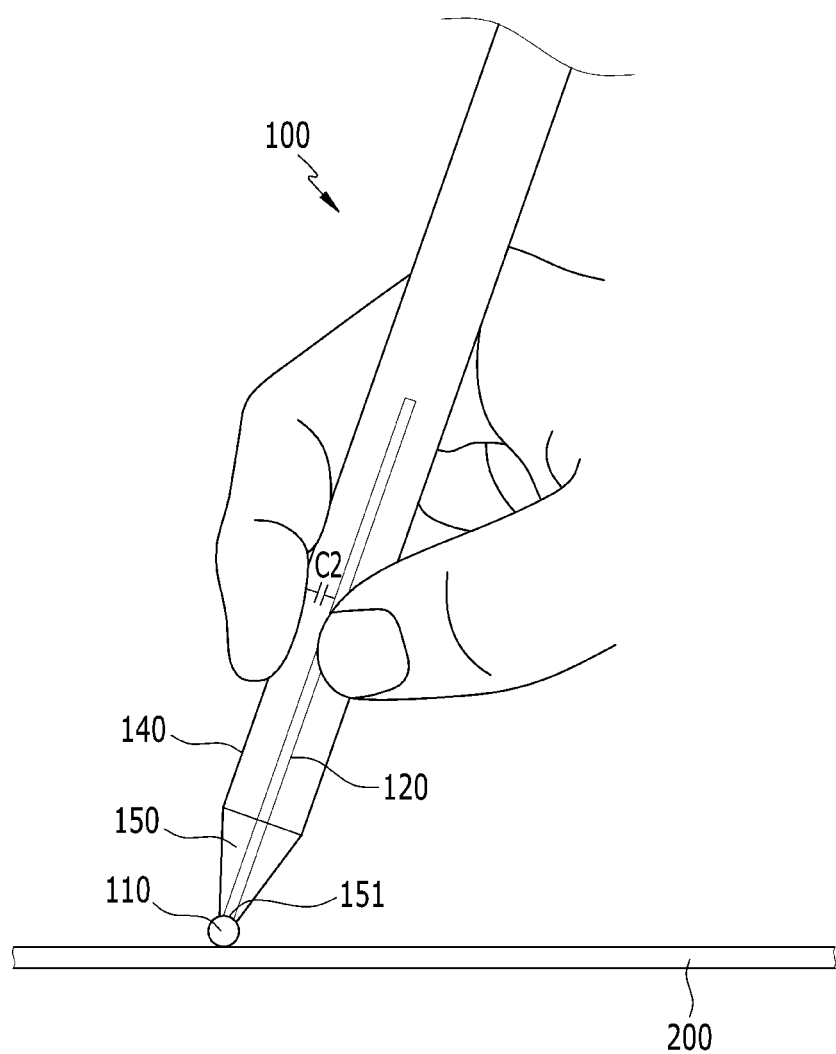
FIG. 4 shows a stylus pen according to a first exemplary embodiment of the present invention.

FIG. 4 shows a stylus pen according to a first exemplary embodiment of the present invention.

As shown in FIG. 4, a stylus pen 100 according to a first exemplary embodiment of the present invention includes a main body 140, a holder 150, a stylus tip 110, and a conductive member 120.

The main body 140 has a diameter that is large enough for a user to grip the pen 100 by the user's hand. In addition, although it is not shown in FIG. 4, the main body 140 is partially opened and thus the conductive member 120 may be exposed to the outside. Then, the conductive member 120 may be grounded by directly contacting a user's finger or hand.

The holder 150 is connected to an end of the main body 140, and an opening 151 is formed at an end of the holder 150. Although FIG. 4 shows a structure in which the main body 140 and the holder 150 are separated and combined, the main body 140 and the holder 150 may be integrally formed. The holder 150 may have various shapes such as a hemispherical shape or a cone shape of which a cross-section is reduced farther away from the main body 140. Such a holder 150 is formed of a non-conductive material.

The stylus tip 110 is formed in the shape of a sphere or has a shape of which some area contacts a sensing surface and has a constant curvature (e.g., a hemisphere), and is partially or wholly derived in the opening 151 of the holder 150. The stylus tip 110 is a portion that directly contacts a sensing surface 200, and is partially or wholly formed of a conductive material. In this case, the stylus tip 110 preferably has a resistance value of 10Ω or less. In addition, a problem due to a tilt offset can be resolved as a diameter of the stylus tip 110 is increased, but since it is difficult to contact a precise location when the diameter is increased, the diameter preferably needs to be 0.5 mm to 3 mm, and particularly, it is preferable that the diameter is less than 2 mm.

The conductive member 120 is connected to the stylus tip 110, and is extended to the holder 150 and the interior of the main body 140. According to the first exemplary embodiment of the present invention, the conductive member 120 extends to an area of the main body 140 and is gripped by the user's hand, and a length of the conductive member 120 is preferably 200 mm or longer. In addition, the conductive member 120 preferably has a diameter or 1 mm or less to minimize a sensitivity effect due to tilting.

Figure 3:
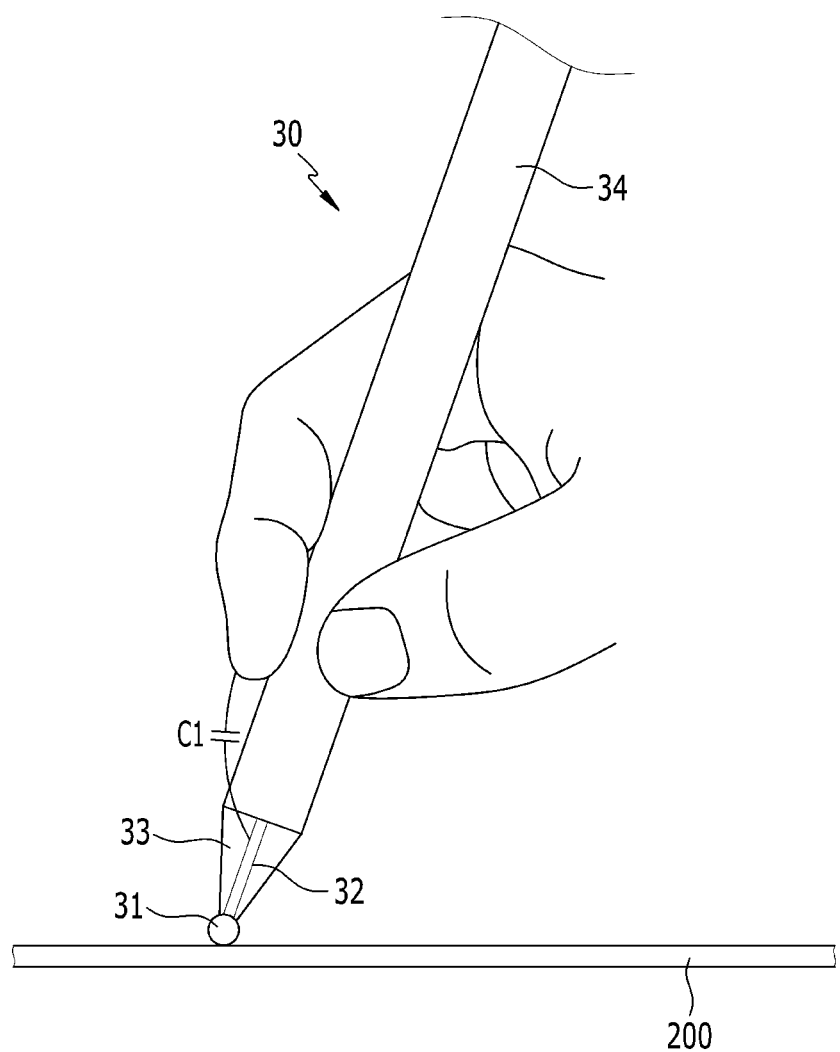

In FIG. 4, according to the first exemplary embodiment of the present invention, the conductive member 120 extends to the portion of the main body 140 and is gripped by the user's hand, and therefore capacitance C2 between the user's fingers and the conductive member 120 is increased compared to the convention art of FIG. 3. Thus, the stylus pen 110 is more influenced by the user's fingers in the grounded state than the conventional art, and thus the amount of charges transmitted to the ground from the stylus tip 110 is increased, thereby enhancing touch sensitivity of the stylus tip 110.

As described, according to the first exemplary embodiment of the present invention, the stylus tip 110 formed in the shape of a sphere or has a shape of which some area contacts a sensing surface and has a constant curvature is used such that a tilt offset problem of the stylus pen 100 is improved, and since the conductive member 120 extends to the area of the main body 140 and is gripped by the user's hand, touch sensitivity of the stylus tip 110 can be enhanced.

FIG. 5A shows a structure of the main body and the holder of the stylus pen according to the first exemplary embodiment of the present invention. In FIG. 5A, the main body 140 is a hollow pipe filled with air.

In FIG. 5A, the holder 150 and the main body 140 are made of materials having different dielectric constants. Specifically, the dielectric constant of the material forming the main body 140 is greater than that of the material that forms the holder 150.

In FIG. 5A, the holder 150 of the stylus pen 100 is formed of a material having a dielectric constant that is as low as possible, and the inside thereof is filled with air. In addition, the main body 140 is formed of a material having a dielectric constant that is as high as possible, and the inside thereof is filled with air. That is, according to FIG. 5A, the dielectric constant becomes higher in the order of the conductive member 120, the outside of the main body 140, the outside of the holder 150, and air.

FIG. 5B shows another structure of the main body and the holder of the stylus pen according to the first exemplary embodiment of the present invention. In FIG. 5B, the main body 140 is provided as a wholly packed encapsulation member.

In FIG. 5B, a dielectric constant of the encapsulation member that forms the main body 140 is formed to be greater than that of a material that forms the holder 150. Specifically, the holder 150 of the stylus pen is formed of a material having a dielectric constant that is as low as possible, and is filled with air. In addition, the main body 140 is formed of an encapsulation member of a material having a dielectric constant that is as high as possible. That is, referring to FIG. 5B, the dielectric constant becomes higher in the order of the conductive member 120, the main body 140, the outside of the holder 150, and air.

Referring to FIG. 5A and FIG. 5B, an area (a first area) near the stylus tip 110 has low capacitance, and an area (a second area) of the main body 140, grounded through the user's hand or coupled with the user's hand, has high capacitance, and accordingly, an influence of a tilting error can be minimized.

Figure 6:
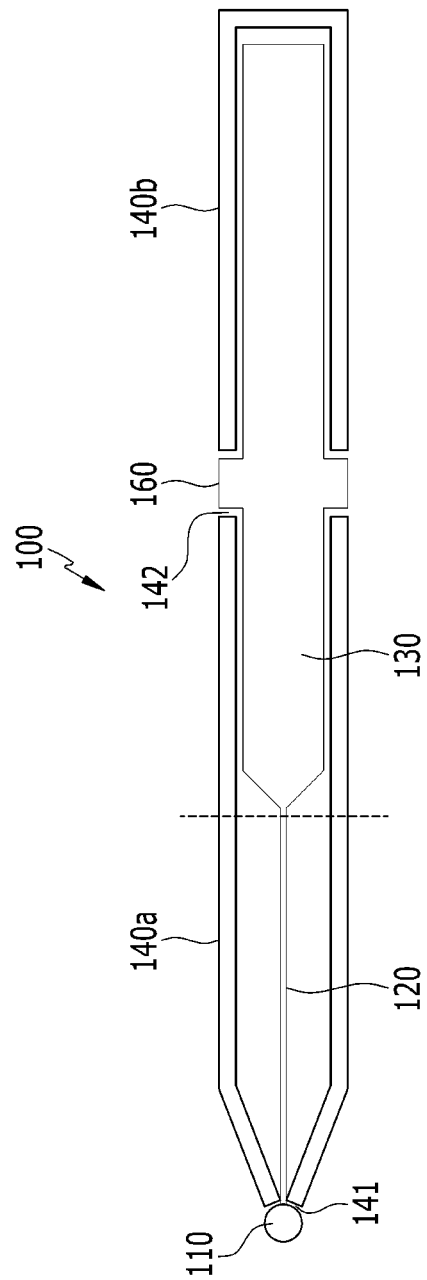
FIG. 6 and FIG. 7 show a stylus pen according to a second exemplary embodiment of the present invention.
Figure 7:
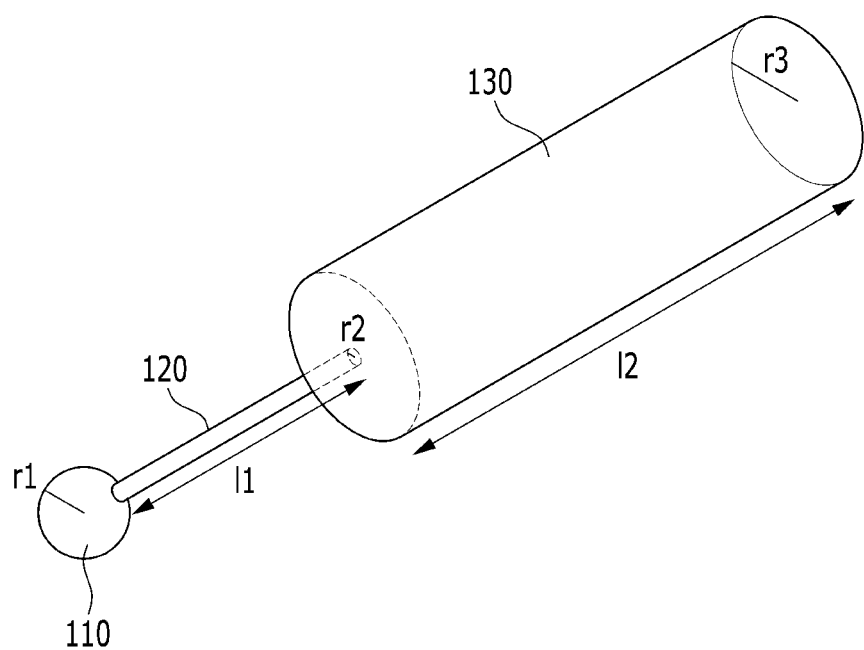

FIG. 6 and FIG. 7 show a stylus pen according to a second exemplary embodiment of the present invention. A stylus pen 100 according to the second exemplary embodiment of the present invention includes a stylus tip 110, a conductive member 120, a conductive mass 130, a first main body 140a, and s second main body 140b.

In FIG. 6 and FIG. 7, the stylus tip 110 is formed in the shape of a sphere or has a shape of which some area contacts a sensing surface and has a constant curvature, and is partially or wholly derived in an opening 141 of the first main body 140a. The stylus tip 110 has a diameter of 0.5 mm to 3 mm.

The conductive member 120 is connected to the stylus tip 110, and is extended to the interior of the first main body 140a. The conductive member 120 preferably has a diameter or 1 mm or less to minimize the sensitivity effect due to tilting.

The first main body 140a may be provided as a hollow pipe or a densely packed encapsulation member, but it is preferable that the first main body 140a is filled with air having the lowest dielectric constant so as to minimize an influence due to finger contact. In addition, a fixing portion (not shown) that fixes the stylus tip 110 is provided inside the first main body 140a.

The conductive mass 130 is electrically connected to the conductive member 120, and is formed inside the second main body 140b. A connection between the conductive mass 130 and the conductive member 120 can be established using various methods, and for example, they may be connected by forming a plate spring (not shown) in one side of the conductive mass 130 and then inserting the conductive member 120 to the plate spring.

In FIG. 7, the conductive mass 130 is formed in the shape of a cylinder having a radius r3 that is greater than a radius r1 of the stylus tip 110 and a radius r2 of the conductive member 120. According to the second exemplary embodiment of the present invention, resistance of the conductive mass 130 is lower than that of the conductive member 120. Accordingly, the user's fingers grip a portion that corresponds to the conductive mass 130, and the amount of charges transmitted to the ground from the stylus tip 110 is increased compared to the first exemplary embodiment, and accordingly, touch sensitivity of the stylus tip 110 can be further enhanced. In FIG. 7, the conductive mass 130 is formed in the shape of a cylinder, but the present invention is not limited thereto, and the conductive mass 130 may be formed in various shapes (e.g., a cone, a rectangular parallelepiped, and the like) of which a surface area is greater than that of the conductive member 120.

In FIG. 6, the first main body 140a and the second main body 140b may be integrally formed in the second exemplary embodiment of the present invention, or may be formed as separable structures. In addition, the first main body 140a and the second main body 140b are preferably formed of a plastic material having a dielectric constant that is as low as possible in order to reduce coupling with a sensor in the touch screen.

One or more contact holes 142 may be provided in an area of the second main body 140b that is contacted by a user's fingers, and a conductive material 160 is filled inside the contact hole 142 and thus may be electrically connected to the conductive mass 130. According to the second exemplary embodiment of the present invention, the conductive mass 130, the conductive member 120, and the stylus tip 110 are directly electrically connected with the user's fingers through the conductive material 160 filled in the contact hole 142, and accordingly, touch sensitivity of the stylus tip 110 can be enhanced. In addition, although it is not illustrated in FIG. 6, the conductive mass 130 may be directly grounded.

FIG. 8A shows a structure of the main body of the stylus pen according to the second exemplary embodiment of the present invention.

In FIG. 8A, the first main body 140a and the second main body 140b are formed of materials having different dielectric constants. Specifically, the dielectric constant of the material forming the second main body 140b is greater than that of the material that forms the first main body 140a.

In FIG. 8A, the first main body 140a of the stylus pen 100 is formed of a material having a dielectric constant that is as low as possible, and is filled with air. In addition, the second main body 140b of the stylus pen 100 is formed of a material having a dielectric constant that is as high as possible, and is filled with air. That is, referring to FIG. 8A, the dielectric constant becomes higher in the order of the conductive member 120, the conductive mass 130, the outside of the second main body 140b, the outside of the first main body 140b, and air.

FIG. 8B shows another structure of the main body of the stylus pen according to the second exemplary embodiment of the present invention. In FIG. 8B, the second main body 140b is formed of the same material as the conductive mass 130.

In FIG. 8B, a dielectric constant of the second main body 140b is higher than that of a material that forms the first main body 140a. That is, referring to FIG. 8B, the dielectric constant becomes higher in the order of the conductive member 120, the second main body 140b, the first main body 140a, and air.

Referring to FIG. 8A and FIG. 8B, an area (a first area) of the first main body 140a, near the stylus tip 110 has low capacitance, and an area (a second area) of the second main body 140b, grounded through the user's hand or coupled with the user's hand, has high capacitance, and accordingly, an influence of a tilting error can be minimized.

Figure 9:
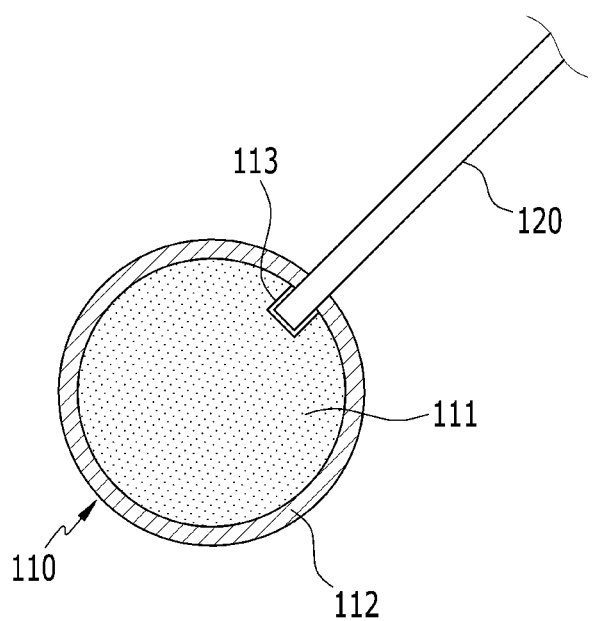
FIG. 9 and FIG. 10 show a detailed structure of a stylus tip according to an exemplary embodiment of the present invention.

FIG. 9 shows the stylus pen according to an exemplary embodiment of the present invention.

In FIG. 9, the stylus tip 110 includes a center body 111 formed of a plastic material, and a conductive layer 112 formed at an outer side of the center body 111. An insertion hole 113 into which the conductive member 120 is inserted is formed in some area of the center body 111.

Since the stylus tip 110 according to the exemplary embodiment of the present invention is a structure in which the conductive layer 110 made of a metallic material is formed outside the center body 111 made of a plastic material having less hardness than a metal, a cover glass of the touch screen can be prevented from being damaged due to impact caused by the stylus tip 110, or generation of noise between the stylus tip 110 and a sense surface can be prevented.

Figure 10:
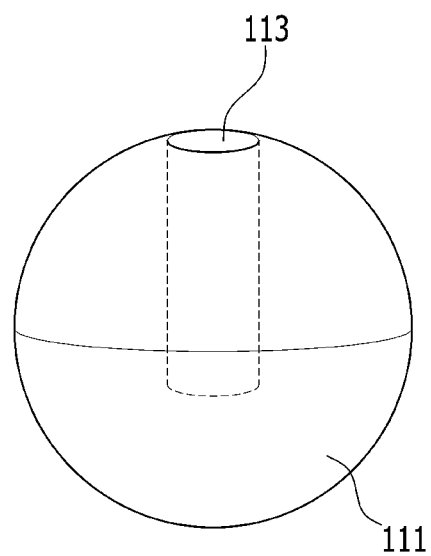
Figure 11:
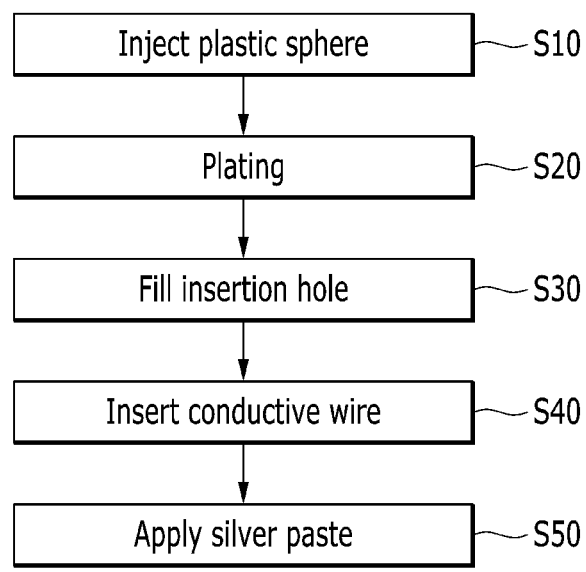
FIG. 11 shows a method for forming the stylus tip according to the exemplary embodiment of the present invention.

Next, a method for forming the stylus tip according to the exemplary embodiment of the present invention will be described with reference to FIG. 9 to FIG. 11.

First, the center body 111 that is made of a plastic material and has the insertion hole 113 is injected (S10). In this case, the insertion hole 113 has a diameter that is slightly larger than that of the conductive member 120.

Next, the conductive layer 112 is formed by using a metallic material such as chromium, aluminum, nickel, silver, and the like (S20). In the exemplary embodiment of the present invention, a chromium conductive layer having high hardness and excellent abrasion resistance is used as the conductive layer, but the present invention is not limited thereto. When the conductive layer 112 is too thick, the glass may be damaged, and when the conductive layer 112 is too thin, insufficient conductivity may be provided. Therefore, the thickness of the conductive layer 112 is preferably formed within a range of 10 to 50 μm.

Next, an adhesive such as an acryl resin, an epoxy resin, and the like is filled into the insertion hole 113 (S30), and then the conductive member 120 is inserted into the adhesive-filled insertion hole 113 and then hardened (S40). Next, a conductive paste is applied to the insertion hole 113 where the conductive member 120 is inserted (S50).

Next, a structure of the stylus tip according to another exemplary embodiment of the present invention will be described.

Figure 12:
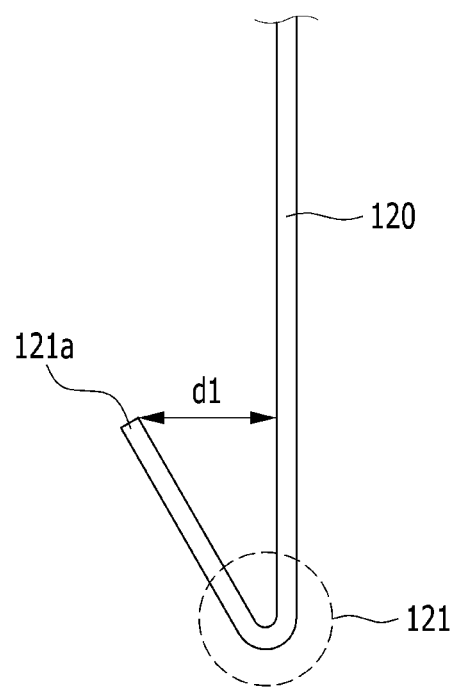
FIG. 12, FIG. 13A, and FIG. 13B show a detailed structure of a stylus pen according to another exemplary embodiment of the present invention.

Referring to FIG. 12, the conductive member 120 is bent in the shape of a letter "V" or "'L. In this case, a distance between an end 121a of the conductive member 120 and the conductive member 120 is set to d1.

Figure 13A:
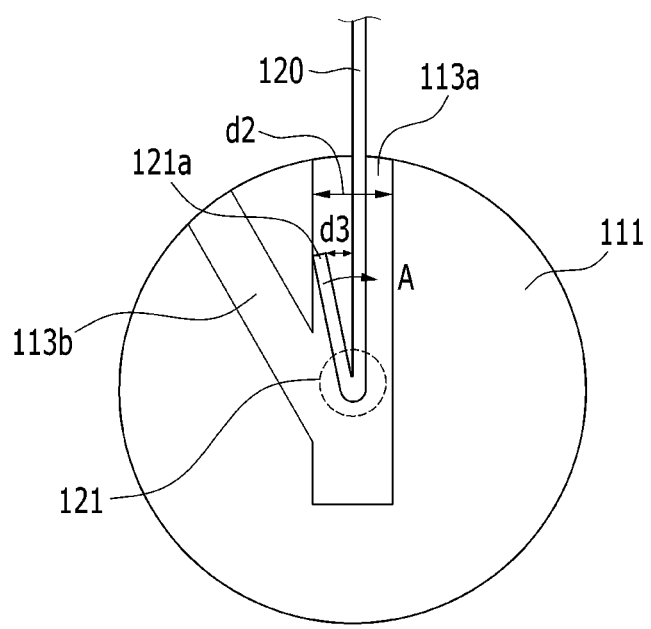
Figure 13B:
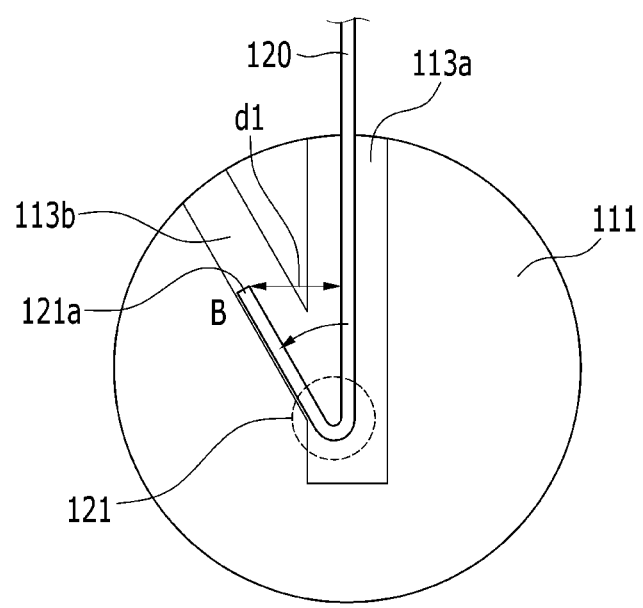

In FIG. 13A and FIG. 13B, a center body 111 that is made of a plastic material includes a first insertion hole 113a to which the conductive member 120 is inserted and a second insertion hole 113b to which a bent portion 121 of the conductive member 120 is inserted. The first insertion hole 113a and the second insertion hole 113b intersect each other in the center body 111. The bent portion 121 of the conductive member 120 may be disposed at a space where the first insertion hole 113a and the second insertion hole 113b intersect.

Here, the distance d1 between the end 121a of the conductive member 120 disposed in the center body 111, and the conductive member 120, is larger than a diameter d2 of the first insertion hole 113a.

Figure 14:
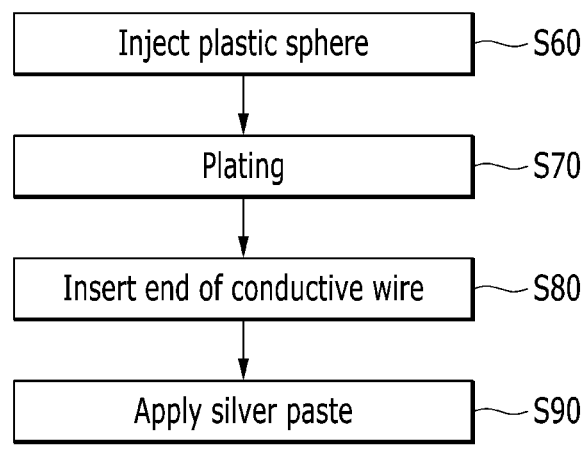
FIG. 14 shows a method for forming the stylus tip according to the other exemplary embodiment of the present invention.

Next, a method for forming the stylus tip according to another exemplary embodiment of the present invention will be described with reference to FIG. 13A, FIG. 13B, and FIG. 14.

First, a center body 111 that is made of a plastic material and includes a first insertion hole 113a and a second insertion hole 113b is injected (S60), and then a conductive layer (not shown) is formed at an outer side of the center body 111 by using a metallic material such as chromium, aluminum, nickel, silver, and the like (S70).

Next, a bent portion 121 of a conductive member 120 is inserted into the first insertion hole 113a (S80).

As shown in FIG. 13A, since a distance d1 between an end 121a of the conductive member 120 and the conductive member 120 before the conductive member 120 is inserted into the first insertion hole 113a is larger than a diameter d2 of the first insertion hole 113a, the bent portion 121 of the conductive member 120 is contracted in a direction (i.e., an A direction) toward the conductive member 120 once the bent portion 121 of the conductive member 120 starts to be inserted into the first insertion hole 113a. In this case, a distance between the end 121a of the conductive member 120 and the conductive member 120 is reduced to d3.

As shown in FIG. 13B, when the bent portion 121 of the conductive member 120 is inserted further lower than a location where the second insertion hole 113b is formed, the bent portion 121 of the conductive member 120, contracted toward the direction of the conductive member 120 is expanded in an opposite direction (i.e., a B direction) due to elasticity. Thus, the distance between the end portion 121a of the conductive member 120 and the conductive member 120 is return to d1. Then, the end portion 121a of the conductive member 120 is located in the second insertion hole 113b.

Accordingly, although the conductive member 120 is lifted in an outer direction of the center body 111, the conductive member 120 does not come out to the outside by the end portion 121a of the conductive member 120 disposed in the second insertion hole 113b.

Next, the first insertion hole 113a and the second insertion hole 113b are bonded by an adhesive and then a silver paste is applied thereto (S90).

Now, a structure of a stylus tip according to another exemplary embodiment of the present invention will be described with reference to FIG. 15.

Figure 15:
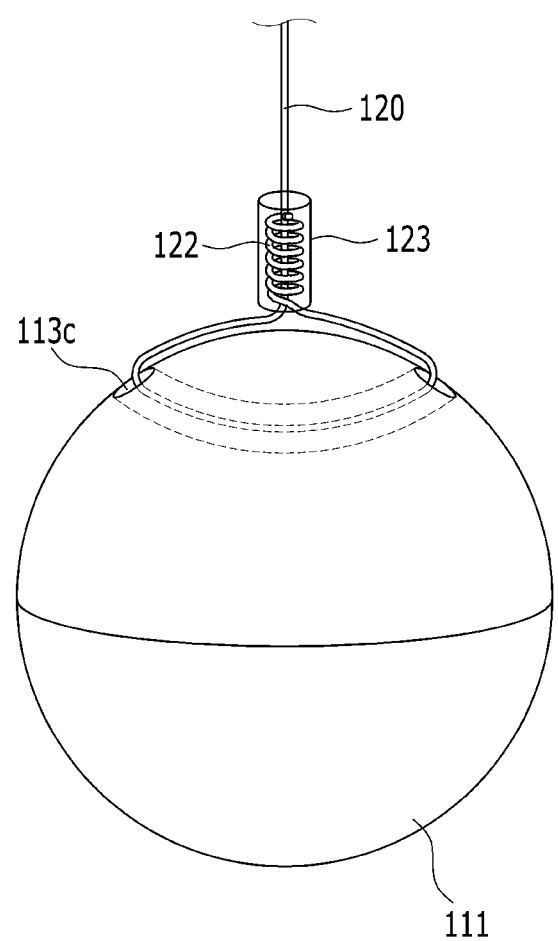
FIG. 15 shows a detailed structure of a stylus tip according to another exemplary embodiment of the present invention.

Referring to FIG. 15, a through-hole 113c that a conductive member 120 penetrates by being inserted therein is formed in some area of a center body 111. A conductive layer (not shown) is formed at an outer side of the center body 111 that is made of a plastic material.

A conductive member unfastening prevention portion 122 of a conductive member, which is an area at an end of the conductive member that is inserted and penetrates the through-hole 113c, winds the conductive member in a closely attached manner. The conductive member unfastening prevention portion 122 can prevent the conductive member from being unfastened from the through-hole 113c.

An unfastening prevention cover 123 surrounds the conductive member unfastening prevention portion 112 in a closely attached manner so as to make the conductive member unfastening prevention portion 122 strongly combined to the conductive member. Although FIG. 15 shows a structure in which the conductive member unfastening prevention portion 122 surrounds the conductive member, the present exemplary embodiment is not limited thereto and may be implemented in various forms.

In FIG. 15, the through-hole 113c may be filled with an adhesive (not shown) to prevent the conductive member from coming out of the through-hole 113c.

In the stylus tip shown in FIG. 15, the conductive member can be strongly combined to the stylus tip 113 by the conductive member unfastening prevention portion 122 and/or the unfastening prevention cover 123, and accordingly, a problem of separation of the conductive member from the stylus tip can be solved.

In FIG. 13A and FIG. 13B, the center body and the conductive member are combined in the formed V-shaped bend, but they may be combined in the form of an L-shaped bend. In addition, the center body 111 is made of a plastic material, but this is not restrictive. The center body 111 may be formed of various types of non-conductive materials or graphite having a certain degree of hardness.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 10, 30: stylus pen, 11, 31: stylus tip, 20: sense surface, 32: conductive member, 33: holder, 34: main body, 100: stylus pen, 120: conductive member, 130: conductive mass, 140: main body, 150: holder, 140a: first main body, 140b: second main body, 142: contact hole, 160: conductive material, 122: unfastening prevention portion, 123: unfastening prevention cover

What is claimed is:

1. A stylus pen comprising:
   a main body;
   a holder that is connected to the main body and of which an opening is formed at an end thereof;
   a stylus tip that is formed by being partially or wholly derived in the opening of the holder, and of which at least a part has a shape of a sphere or a shape of which some area contacting a sense surface has a constant curvature;
   a conductive member that is electrically connected to the stylus tip and extends to the holder and the interior of the main body; and
   a conductive mass that is electrically connected to the conductive member,
   wherein the dielectric constant of the main body is higher than that of the holder,
   wherein the main body has an opening and thus the conductive member is partially exposed to an outside of the main body through the opening, and
   wherein resistance of the conductive mass is lower than resistance of the conductive member.

2. The stylus pen of claim 1, wherein the stylus tip comprises:
   a center body that is made of a plastic material; and
   a conductive layer that is provided at an outer side of the center body.

3. The stylus pen of claim 2, wherein an insertion hole to which the conductive member is inserted is formed in some area of the center body.

4. A stylus pen comprising:
   a first main body of which an opening is formed at an end thereof;
   a second main body connected to the first main body;
   a stylus tip that is formed by being partially or wholly derived in the opening of the first main body, and of which at least a part has a shape of a sphere or a shape of which some area contacting a sense surface has a constant curvature;
   a conductive member that is electrically connected to the stylus tip and extends to the interior of the first main body; and a conductive mass that is electrically connected to the conductive member and extends to the interior of the second main body, wherein the dielectric constant of the second main body is higher than that of the first main body, wherein at least one contact hole is formed in an area of the second main body, the contact hole is configured to contact a user's fingers, and the contact hole is filled with a conductive material and thus electrically connected to the conductive mass, and wherein resistance of the conductive mass is lower than resistance of the conductive member.

5. The stylus pen of claim 4, wherein the conductive mass has a larger surface area than the conductive member.

6. The stylus pen of claim 4, wherein a fixing portion that fixes the stylus tip is provided in the interior of the first main body.

7. The stylus pen of claim 4, wherein the stylus tip comprises:
a center body that is made of a plastic material; and
a conductive layer that is formed at an outer side of the center body.

8. The stylus pen of claim 7, wherein an insertion hole to which the conductive member is inserted in formed in some area of the center body.

9. A stylus pen comprising:
a main body;
a stylus tip of which at least a part has a shape of a sphere or a shape of which some area contacting a sense surface has a constant curvature;
a holder that is connected to the main body; and
a conductive member that is electrically connected to the stylus tip, wherein the stylus tip comprises:
a center body that is made of a non-conductive material; and
a conductive layer that is formed at an outer side of the center body, wherein the dielectric constant of the main body is higher than that of the holder, wherein the main body has an opening and thus the conductive member is partially exposed to an outside of the main body through the opening, and wherein resistance of the conductive mass is lower than resistance of the conductive member.

10. The stylus pen of claim 9, wherein a first insertion hole and a second insertion hole are respectively formed in a first area and a second area of the center body, and
a bent portion of the conductive member is located in a space where the first insertion hole and the second insertion hole cross each other.

11. The stylus pen of claim 10, wherein the conductive member is inserted into the first insertion hole and an end of the conductive member is inserted into the second insertion hole.

12. The stylus pen of claim 9, wherein a through-hole through which the conductive member is penetrated by being inserted therein is formed in some area of the center body, and a conductive member unfastening prevention portion is formed at an end of the conductive member that has penetrated the through-hole.

13. The stylus pen of claim 12, further comprising an unfastening prevention cover that surrounds the conductive member unfastening prevention portion in a closely attached manner.

* * * * *